(12) United States Patent
Allen et al.

(10) Patent No.: US 8,230,053 B2
(45) Date of Patent: Jul. 24, 2012

(54) WEB ADDRESS CONVERTER FOR DYNAMIC WEB PAGES

(75) Inventors: Joshua Allen, Kirkland, WA (US); Jeffrey L. Ranck, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/360,759

(22) Filed: Jan. 27, 2009

(65) Prior Publication Data

US 2009/0132551 A1 May 21, 2009

Related U.S. Application Data

(60) Continuation of application No. 11/614,647, filed on Dec. 21, 2006, now Pat. No. 7,512,710, which is a division of application No. 09/560,703, filed on Apr. 27, 2000, now Pat. No. 7,200,677.

(51) Int. Cl.
*G06F 15/16* (2006.01)

(52) U.S. Cl. ......... 709/223; 709/220; 709/203; 714/46; 715/501.1

(58) Field of Classification Search .................. 709/230, 709/245, 203; 714/46; 715/501.1
See application file for complete search history.

(56) References Cited

U.S. PATENT DOCUMENTS

| | | | |
|---|---|---|---|
| 5,929,849 A | 7/1999 | Kikinis | |
| 6,018,748 A * | 1/2000 | Smith | ........................... 715/207 |
| 6,161,127 A | 12/2000 | Cezar et al. | |
| 6,226,642 B1 | 5/2001 | Beranek et al. | |
| 6,434,614 B1 | 8/2002 | Blumenau | |
| 6,442,714 B1 | 8/2002 | Griffin et al. | |
| 6,453,306 B1 | 9/2002 | Quelene | |
| 6,470,383 B1 | 10/2002 | Leshem et al. | |
| 6,701,307 B2 | 3/2004 | Himmelstein et al. | |
| 6,895,430 B1 | 5/2005 | Schneider | |
| 6,980,311 B1 | 12/2005 | Currans et al. | |

OTHER PUBLICATIONS http://web.archive.org/web/19991007105720/222.pstru h.cz/help/u rlrepl/library.htm.*
Pstruh, URL Replacer, retrieved on Sep. 16, 2005 at <<http://web.archive.org/web/19991007105720/www.pstruh.cz/help/urlrepl/library.htm>>, pp. 1-2.
URL Replacer, Pstruh.cz, pub date Oct. 13, 1999.

* cited by examiner

*Primary Examiner* — Tammy Nguyen
(74) *Attorney, Agent, or Firm* — Lee & Hayes, PLLC

(57) ABSTRACT

A Web address converter helps dynamic Web sites get the attention of spiders of Internet search engines. With the Web address converter, requests from Web browsers using static addresses access corresponding dynamic Web pages and requests from search engines generate an instance of a Web page having links with static addresses pointing to corresponding dynamic Web pages. The Web address converter performs both Dynamic-to-Static (D-to-S) address conversion and Static-to-Dynamic (S-to-D) address conversion. D-to-S address conversion is done when generating a spider-friendly main page for a spider of a search engine to crawl. S-to-D address conversion is used when a browser uses a static address to access a corresponding dynamic Web page. The static address that the browser uses was originally created when the spider-friendly main page was generated.

20 Claims, 5 Drawing Sheets

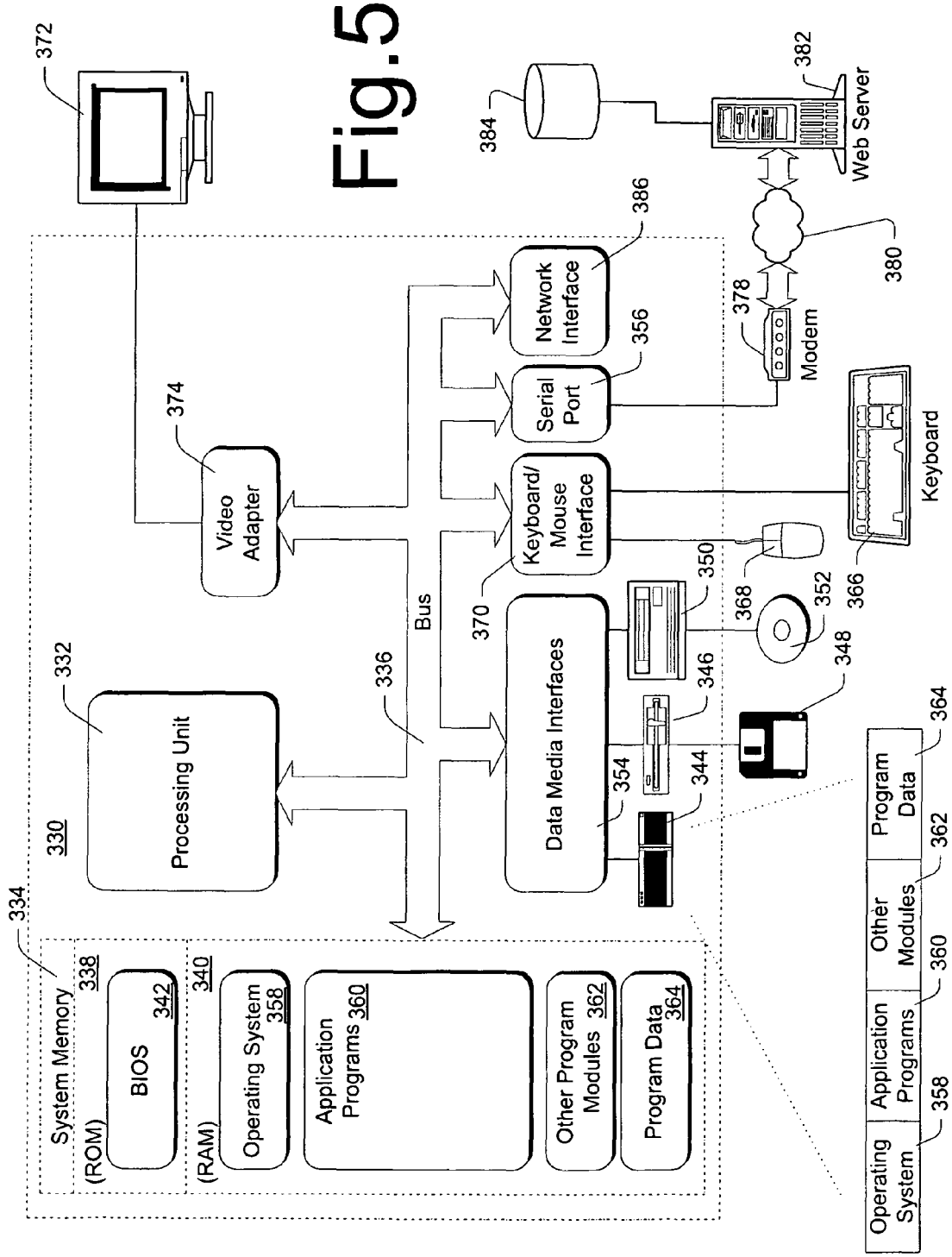

WEB ADDRESS CONVERTER FOR DYNAMIC WEB PAGES

RELATED APPLICATIONS

This application is a continuation of and claims priority from U.S. patent application Ser. No. 11/614,647, titled "Web Address Converter for Dynamic Web Pages", filed on Dec. 21, 2006, and hereby incorporated by reference. U.S. patent application Ser. No. 11/614,647 is a divisional of and claims priority from U.S. patent application Ser. No. 09/560,703, titled "Web Address Converter for Dynamic Web Pages", filed on Apr. 27, 2000, which issued on Apr. 3, 2007, as U.S. Pat. No. 7,200,677, and hereby incorporated by reference.

BACKGROUND

There are more than a billion documents available on the World Wide Web ("Web") over the Internet and this number continues to rapidly increase. These documents ("Web pages") are stored as files on Web servers. Each of these Web pages has a unique Web address. These addresses are also called Uniform Resource Locators (URLs) or Universal Resource Locators (URLs). URLs are more fully explained in RFC 1738 "Uniform Resource Locators (URL) Berners-Lee, Masinter & McCahill."

Static Web Pages and Static Addressing

An Internet device, such as a computer using a Web browser, typically accesses a specific Web page by providing its unique Web address (e.g., a URL). That Web page is a static file stored on a Web server. The file is simply copied without change to the requesting Internet device. Every device accessing the static file sees the same results. The stored file remains unchanged until an authorized user actively modifies the file. These types of Web pages are typically called "static." A typical URL for a static Web page looks like this:

http://domain.name.com/pagename.htm

The "http://" is the value of the scheme field and it identifies the protocol scheme being used to transmit over the Internet. For the Web, the protocol scheme typically is HyperText Transfer Protocol (HTTP). The "domain.name.com" is the value of the hostname field and it identifies the domain (or the Web server) that hosts the Web page addressed by the static URL. The actual format of this field depends upon the domain name conventions observed. Typically, the format includes a domain name and an extension (e.g., microsoft.com).

The "pagename" is the value of the path field and/or the file-name field. It may include a path to the specific Web page. It includes the file name of the specific Web page. The ".htm" is the value of the file-extension field and it identifies the format of the file. In this example, the format of the static file is the most common format for a Web page: HyperText Markup Language (HTML).

Dynamic Web Pages and Dynamic Addressing

The opposite of a static Web page is a "dynamic" Web page. A dynamic Web page is one that is created the moment the page is accessed and it is usually created based upon data in a database. Unlike a static Web page, a dynamic Web page that a viewer sees is not stored intact on a Web server. Instead, a dynamic Web page is generated anew each time it is accessed.

A dynamic Web page is generated based upon a stored file containing instructions and an associated database. Therefore, each instance of a generated dynamic Web page may be different from a previously generated page using the same address. There are many different implementations of dynamic Web pages. The implementation differs from each other in the set of instructions used in the stored file on the Web server and the type of database accessed. Examples of such implementations include Active Server Pages (ASP) by the Microsoft Corporation and "JavaBeans" Activation Framework (JAF).

A typical URL for a dynamic Web page may look like this:

http://domain.name.com/pagename.asp?parm1=val1&parm2=val2

This example uses an ASP implementation. The protocol scheme, hostname, path, and filename fields are the same as those fields in the static URL. However, there are fields in a dynamic address that are different from fields in a static address.

The extension ".asp" is a value of a file-extension field and identifies the format of the dynamic-page-generation instructions. The extension ".asp" indicates that the page is formatted as an Active Server Page (ASP). The "?" symbol is a signal that the URL points to a dynamic page and it separates the portion of the dynamic URL referring to a specific file and the portion of the URL containing parameters.

The "parm1=" and "parm2=" elements identify the names of categorized parameter. The values of these parameters are used to generate the dynamic Web page. "val1" and "val2" are the values of the parameters. The values are typically used to access items in a database. A parameter consists of a parameter name and its associated value. There can be a series of many parameters. The "&" symbol separates each parameter for the other parameters.

Web Search Engines and Spiders

No central bibliographic authority exists to catalog the information found on the tens of millions of Web sites on the Internet. Generally, two basic approaches are available for finding the proverbial needle in this immense Web haystack: a subject directory or a search engine.

Subject directories, such as "Snap" and "MSN", catalog Web pages and organize them by subject. Each Web page is manually (or automatically) analyzed and categorized. Users can browse through the various categories and subcategories in the subject directories to find a Web site on a particular topic. Typically, Web pages are categorized and added to the directory by professional Web searchers or by user submissions.

A search engine provides a searchable database of indexed keywords. A search engine examines Web pages for specified keywords and returns a list of the Web pages where the keywords were found. Although search engines are general class of programs, the term is often used to specifically describe systems like "Alta Vista" and "Excite" that enable users to search for Web pages on the Web.

A search engine includes two main parts: index searcher and index generator. An index searcher includes a database of indexing keywords of Web pages and logic for searching that database. An index generator includes a "spider" for gathering Web pages and an "indexer" for generating an index into those pages.

Typically, a search engine works by sending out the spider to fetch as many pages as possible. The indexer then reads these pages and creates an index based on the words contained in each page. Each search engine typically uses a proprietary algorithm to create its indices such that, ideally, only meaningful results are returned for each query.

Spiders are sometimes referred to as "Web-spiders", "robots", "Web wanderers", "crawlers", "Web-crawler", "ants", or "worms." These alternative names refer to programs that have the same basic functionality to visit Web sites by requesting documents from them.

A spider will "crawl" a Web page by following links found on the page. Normal Web browsers (e.g., "Internet Explorer") are not spiders, because they are operated by humans, and don't automatically retrieve referenced documents.

Provided with a page by a spider, an indexer parses the document and inserts selected keywords into the database with references back to the original location of the source page. How this is accomplished depends on the indexer. Some indexers index the titles of the Web pages or the first few paragraphs. Some parse the entire contents and index all words. Some parse the meta-tag or other special hidden tags.

Meta-tags are special HTML tags that provide information about a Web page. Unlike normal HTML tags, meta-tags do not affect how the page is displayed. Instead, they provide information such as who created the page, how often it is updated, what the page is about, and which keywords represent the page's content. Many search engines use this information when building their indices.

When visiting a Web site, most spiders will check a file called the "robots.txt" file. This file informs the spider whether the spider is authorized to search the site and if so authorized, which pages on the site to retrieve.

Single-destination Web sites called "portals" are often a combination of a "subject directory" and a "search engine." These portals include a search engine (with its spider and indexer) or are closely associated with a third-party search engine. These portals often include an organized and customized subject directory.

The Invisible Web

The Invisible Web is made up of information stored in Web databases. Unlike pages on the visible Web, information in databases is generally inaccessible to the spiders to compile search engines.

Search engines typically index the Web by visiting Web pages and indexing their content. In particular, the spiders use the links found on pages to find new Web pages. The links include static URLs.

Most spiders tend to ignore the content of a dynamic Web address and thus, the contents of the referenced dynamic Web page. These dynamic Web pages are often ignored because the format of their dynamic URL is different from the URL format of a static Web page. Spiders are often specifically programmed to ignore dynamic addresses because of the complexity of navigating through dynamic pages.

The information found in the databases of dynamic Web sites is not indexed by search engines. Therefore, these dynamic Web sites are not found by those using search engines to search the Web. This huge, unmapped region of the Internet is called the "Invisible Web."

E-commerce sites with on-line shopping catalogs typically use dynamic Web pages because their databased inventory is changing constantly. These sites wish to be indexed by search engines to help bring users to their site.

Conventional Solution

To allow search engines to index their sites, dynamic sites (such as e-commerce sites with inventory) periodically generate "snapshots" of their dynamic Web pages. These snapshots are static Web pages generated from corresponding dynamic Web pages, which are generated at a moment in time.

However, there are several significant drawbacks to the "snapshot" approach. In a short period of time, the snapshots no longer represent the current inventory. Periodically generating the snapshots consumes processing and storage resources.

Although the snapshot approach does allow a search engine to index the dynamic Web site, the URLs stored by the search engine are static URLs. Therefore, the search engine ultimately directs a user to the snapshot pages rather than to the preferable dynamic pages. Dynamic sites would prefer users to use their dynamic page to take full advantage of the dynamic nature of the site. If the users are using the snapshot pages, then the information seen by the user may not be accurate.

SUMMARY

A Web address converter at a Web server converts dynamic addresses pointing to dynamic Web pages to static addresses. A dynamic address is converted to a static address by removing fields of the dynamic address that are specific to dynamic addresses. In some implementations, fields of the dynamic address that are common to both static addresses and dynamic addresses are retained as part of the static address. In additional implementations, fields specific to static addresses are added to generate the static address.

The Web address converter also converts the static addresses to dynamic addresses when receiving requests to access dynamic Web pages, where the requests include a particular static address pointing to a requested dynamic Web page. After receiving a request to access a dynamic Web page, the Web address converter removes fields from the static address that are specific to static addresses. Further, in some instances, fields of the static address that are common to dynamic addresses and static addresses are retained and fields specific to dynamic addresses are added to generate the dynamic address.

BRIEF DESCRIPTION OF THE DRAWINGS

FIG. 5 is an example of a computer capable of implementing the Web address converter for dynamic Web pages.

DETAILED DESCRIPTION

The following description sets forth a specific embodiment of the Web address converter for dynamic Web pages that incorporates elements recited in the appended claims. This embodiment is described with specificity in order to meet statutory written description, enablement, and best-mode requirements. However, the description itself is not intended to limit the scope of this patent. Rather, the inventor has contemplated that the claimed Web address converter might also be embodied in other ways, in conjunction with other present or future technologies.

The following description sets forth a Web address converter for dynamic Web pages that enable the use of static addresses to access corresponding dynamic Web pages. The converter provides static to dynamic URL mapping for certain incoming static addresses. The converter also provides for the dynamic generation of an instance of a Web page containing links to dynamic Web pages, but the links include static addresses pointing to the dynamic Web pages.

Dynamic Web Sites and the Internet

Figure 1:
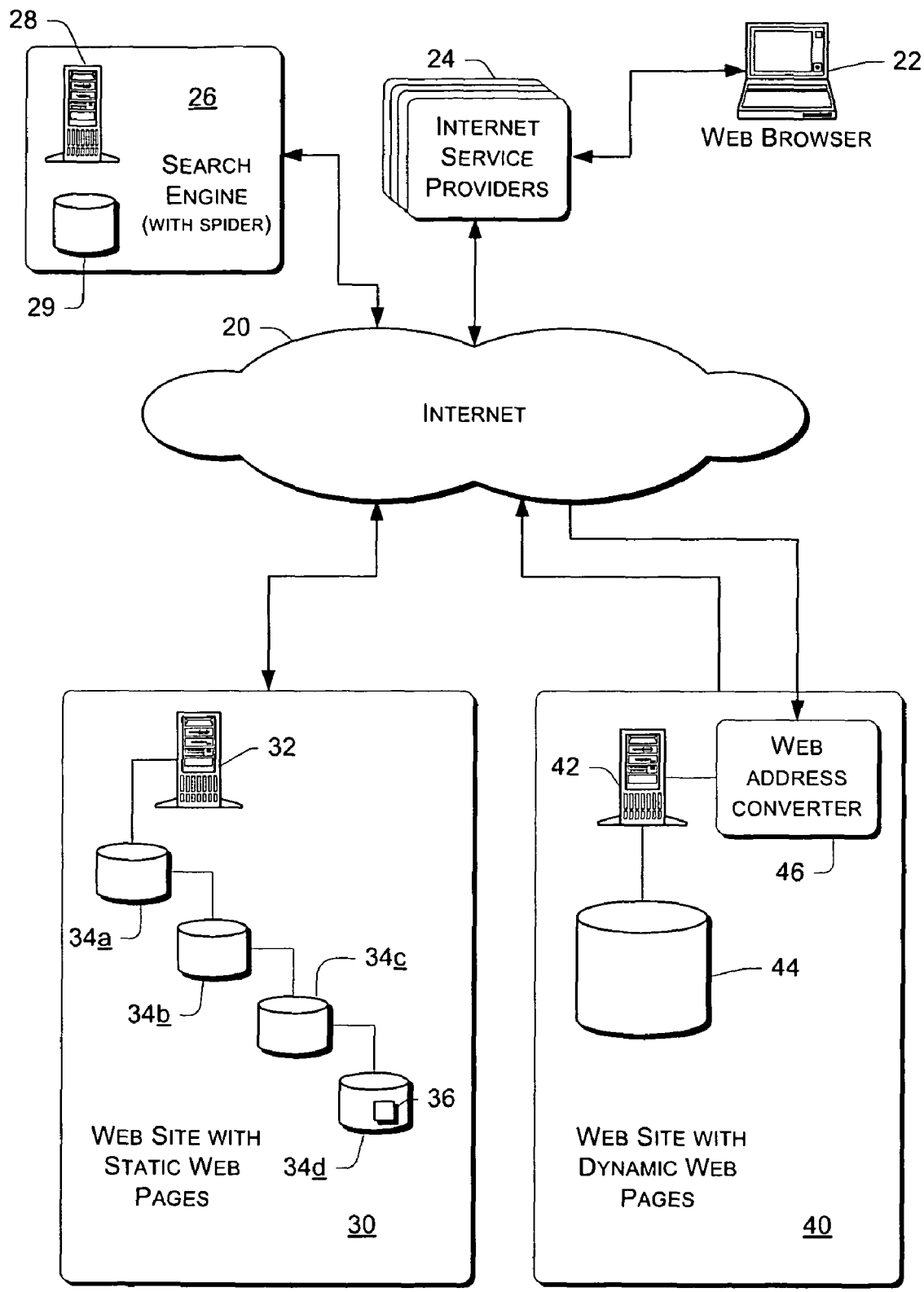
FIG. 1 is a schematic illustration of an exemplary computer network (such as the Internet) that includes a Web site hosting dynamic Web pages. The site includes a converter implementing an embodiment of the Web address converter for dynamic Web pages.

FIG. 1 shows a computer network that includes computers linked via Internet 20. Client 22 using a Web browser (e.g., "Internet Explorer" by the Microsoft Corporation) may access the Internet via one or more Internet Service Providers (ISPs) 24.

FIG. 1 shows a search engine (with a spider) 26 connected to the Internet 20. The search engine 26 includes a Web server (or collection of Web servers) 28 and a database 29. The database 29 stores indexed keywords associated with source Web pages.

The search engine 26 contains the searchable database 29 of keywords that are associated with Uniform Resource Locators (URLs) pointing to Web pages. Typically, a search engine uses a "spider" program module to fetch as many documents (i.e., Web pages) as possible. An "indexer" of the search engine reads these documents and creates a database based on the words contained in each document.

FIG. 1 also shows a static Web site 30 connected to the Internet 20. The static Web site 30 includes a Web server (or collection of Web servers) 32. The static Web site 30 contains static Web pages stored in a file located in the file system of the Web server 32, and stored in non-volatile memory, such as disk drives 34a-34d.

Disk drives 34a-34d illustrate a hierarchical path to a file containing a static Web page on drive 34d. Suppose that drive 34a is named "root"; drive 34b is named "sub1"; drive 34c is named "sub2"; drive 34d is named "sub2"; and a file 36 named "file.htm". The path to file 36 would be "/root/sub1/sub2/sub3/file.htm"

Although the path is shown as multiple disk drives 34a-34d, the path typically will be both file directories and subdirectories on the same file system of the Web server. Alternatively, the path may be across multiple Web servers.

FIG. 1 shows a dynamic Web site 40 connected to the Internet 20. The dynamic Web site 40 includes a Web server (or collection of Web servers) 42. The dynamic Web pages are dynamically generated by the server 42 based upon data stored in database 44.

The dynamic Web site 40 also includes a Web address converter 46. The converter 46 implements the exemplary embodiment of the Web address converter. The converter 46 may be a filter designed to examine incoming requests of the dynamic Web site. Although the converter 46 is shown as a filter that is separate from the server 42, the converter may be part of the server.

A filter determines whether incoming requests meet given requirements. If so, then it performs specified actions and/or modifies the request before passing it along to the Web server 42. A filter is typically installed on port 80 (TCP:80) to capture Web-related traffic.

Although a filter implementing the converter 46 may be hardware, it is software in the exemplary embodiment. Specifically, the converter 46 is an ISAPI (Internet Server Application Programming Interface) filter. ISAPI is an easy-to-use, high-performance interface and API for back-end applications for "Internet Information Server" (IIS) by the Microsoft Corporation. An ISAPI filter is a replaceable dynamic link library (DLL) that the server calls on every HTTP (Hypertext Transfer Protocol) request. When the filter is loaded, it tells the server what sort of notifications in which it is interested. After that, whenever the selected events occur, the filter is called and given the opportunity to process that event.

Alternatively, the filter implementing the converter 46 may be a software program designed for that purpose, it may be part of a Web serving application, and it may be part of the operating system. Also, the functional components of the filter may be distributed over multiple Web servers in one site or multiple sites.

Web Address Mapping

Figure 2:
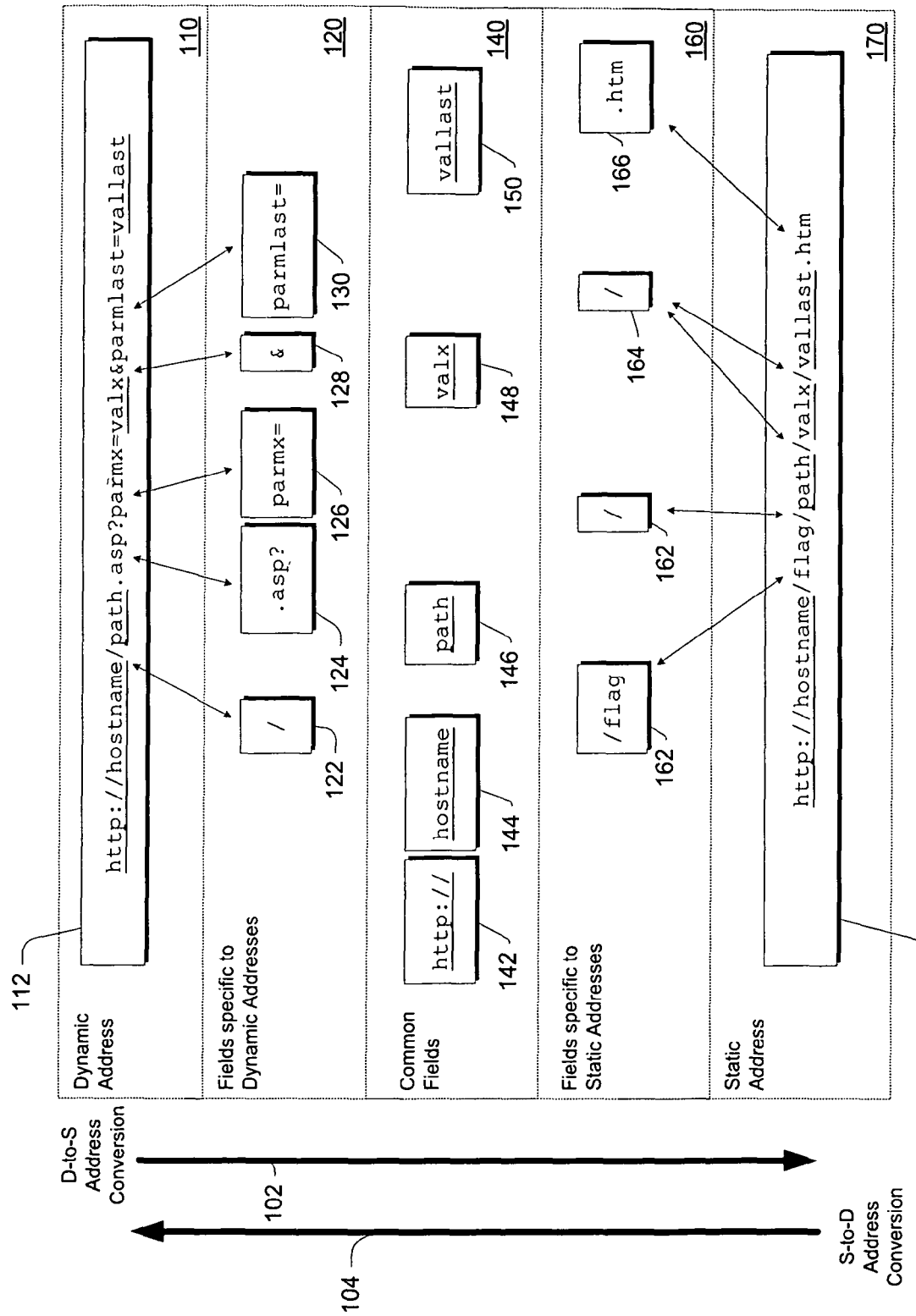
FIG. 2 is a bidirectional address-conversion-mapping diagram showing:
  from top to bottom, an exemplary implementation of dynamic-to-static (D-to-S) address conversion; and
  from bottom to top, an exemplary implementation of static-to-dynamic (S-to-D) address conversion.

FIG. 2 shows an example of Web address mapping for converting Web addresses from one type to another type that is implemented by Web address converter 46. This address conversion is done so that requests from Web browsers using static addresses can access dynamic Web pages. Also, it is done so that requests from spiders of search engines generate an instance of a spider-friendly Web page having links with static addresses pointing to dynamic Web pages.

There are two types of Web address conversion: Static-to-dynamic (S-to-D) and dynamic-to-static (D-to-S). Each is the reverse of the other. S-to-D address conversion is performed to redirect requests from Web browsers using static addresses to corresponding dynamic Web pages. D-to-S address conversion is performed to generate an instance of a spider-friendly Web page having links with static addresses pointing to corresponding dynamic Web pages.

FIG. 2 shows the address conversion mapping generally at 100. Reading from top to bottom shows D-to-S address conversion as represented by "down" arrow 102. Reading from bottom to top shows S-to-D address conversion as represented by "up" arrow 104. Unless specifically stated otherwise, the addition of any field or value in one conversion direction corresponds to the removal of the same field or value in the other conversion direction, and vice versa.

Block 110 shows a generic example of a dynamic address at 112. The dynamic address points to a dynamic Web page. The dynamic address 112 shown in FIG. 2 is http://hostname/path.asp?parmx=valx&parmlast=vallast Block 120 shows the fields removed from the dynamic address 112 to convert the dynamic address of 112 to a static address that points to the same dynamic Web page. The following fields are removed:

a field-separator symbol ("/") at 122;
a dynamic file extension (".asp") and a file-parameter-separator symbol ("?") at 124;
one or more parameter names ("parmx") and a symbol ("=") that equates each of them to value at 126;
a file-parameter-separator symbol ("&") used to separate each parameter from each other parameter at 128 (a parameter includes a parameter name and its value); and
a last parameter name ("parmlast") in the series of parameters and the symbol ("=") that equates it to its value at 130.

If there is only one parameter, then "parmlast" will be the only parameter name and there will be no "&" symbol.

Block 140 shows the fields that are found in both the source Web address and the converted Web address. Generally, these common fields are the basis for converting from one address type to another. These common fields map from the original address to specific positions in the converted address.

The common fields include "scheme" field at 142 that identifies the protocol scheme being used to transmit the request for a Web page and the protocol scheme to be used to send the requested Web page. Since the exemplary embodiment is used for converting Web addresses, the typical protocol scheme is HTTP; therefore, the value of the scheme field 142 normally is "http://".

Other common fields shown in block 140 include a "hostname" field at 144, a "path" at 146, a "valx" at 148, and a "vallast" at 150.

The hostname field 144 contains a name of a Web server (or Web site) hosting the dynamic Web page. The name in the hostname field at 144 is "hostname" and it is derived from the static Web address 112.

The path field 146 contains a name of a hierarchical path used to access the file containing instructions for generating the dynamic Web page. The name in the path field at 146 is "path" and is derived from the static Web address 112. Similar to the hierarchical path illustrated by the disk drives 34a-34d of FIG. 1, the path in the path field 146 may be one or more levels. For example, the path may be "path"; "root/path"; or "root/subpath1/subpath2/path".

The valx value field 148 may be one or more parameter values. Each valx value field contains a value associated with a parameter name (like "parmx" 126). The "=" symbol equates each parameter with a specific value. For example, "parmx" has a value of "valx".

The vallast value field 150 has a value associated with the last parameter name (like "parmlast" 130). The "=" symbol equates the last parameter name with a specific value. For example, "parmlast" has a value of "vallast". If there is only one parameter in the dynamic address 112, then "vallast" will be the only value and there will be no valx values.

Block 160 shows the fields added to the common fields of block 140 to convert the dynamic address of 112 to a static address that points to the same dynamic Web page. The following fields are added:
  a field-separator symbol ("/") and an alias-indicator flag ("flag") at 162;
  one or more field-separator symbol ("/") at 164;
  a static file extension (".htm") at 166 that indicates that the format of the file is static although the file's format is actually dynamic.

The alias-indicator flag 162 is inserted into the resulting static address so that the exemplary converter will recognize it as a static address that does not point to an actual static Web page. Rather, the address with the alias-indicator flag points to a dynamic Web page.

Block 170 shows an example of a converted static address at 172. This static address points to the same dynamic Web page that the dynamic address of 112 does. The static address 172 shown in FIG. 2 is
  http://hostname/flag/path/valx/vallast.htm The arrows between the fields of block 160 and the static address 172 of block 170 illustrate the relative mapping of the fields into the static address. The fields 162-166 are inserted between the common fields 142-150 of block 140 to form the static address 172.

In FIG. 2, the common fields 142-150 of block 140 are shown underlined in the dynamic address 112 and the static address 172. The underlining makes the common fields easier to locate in the originating dynamic address 112 and the resulting static address 172. The underlining also highlights the existence and the relative location of each field in the both addresses. Furthermore, it distinguishes the common fields from other fields that are specific to only one type of address.

The arrows between blocks 110 and 120 illustrate which fields are removed from the dynamic address 112 and where the fields are removed. Likewise, the arrows between blocks 160 and 170 illustrate which fields are added to the common fields to form the static address 172 and where the fields are added.

The above description of FIG. 2 is given reading from top to bottom to illustration D-to-S address conversion. However, as mentioned above, the addition of any field or value for the above-described D-to-S address conversion corresponds to the removal of the same field or value in the S-to-D address conversion. Likewise, the removal of any field or value for the above-described D-to-S address conversion corresponds to the addition of the same field or value in the S-to-D address conversion.

Alternative Parameter Value Mapping

In the exemplary embodiment of the Web address converter, the converter places the parameter values (such as "valx" or "vallast") based upon their relative position in the original dynamic address. For example, "valx" is before "vallast". When such a static address is converted back (remapped) to a dynamic address, the converter assumes the parameter fields based upon the relative positioning of the parameter values in the static address. For example, "parmlast" is assumed to be equal to "vallast" because "vallast" is the last field in the static address.

In an alternative embodiment, the parameter associations may be specified in the static address so that values are remapped back to specific parameters. This may occur in a variety of ways. As one example, assume the following original dynamic address:
  http://hostname/
  path.asp?parmA=valA&parmB=valB&parmC=valC
This dynamic address may be converted into this static address:
  http://hostname/flag/path/parmA=valA/parmB=valB/
  parmC=valC.htm
An alternative encoding may be:
  http://hostname/flag/path/parmA/valA/parmB/valB/parmC/
  valC.htm
Any encoding that includes both the parameter name and the value in such a way that the original pairing can be extracted may be used. When such an alternative embodiment of the Web address converter maps this static address backs to its original dynamic address, it will not assume how to map the values back to the dynamic address. Rather, it will examine the static address to see exactly how to map the values to which parameters because the parameters themselves are specified in the static address.

Method of Web Address Analysis and Conversion

Figure 3:
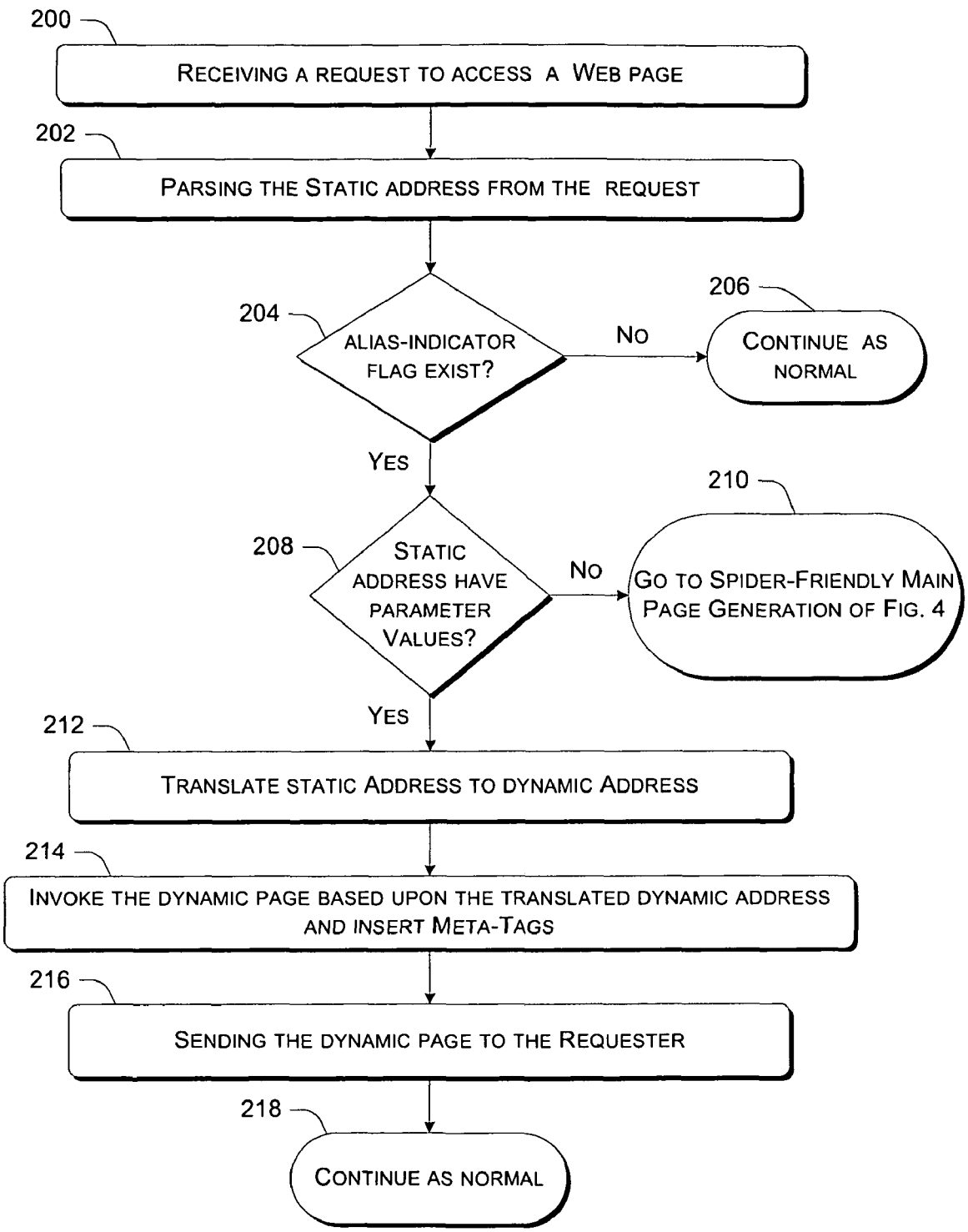
FIG. 3 is flowchart showing a process implementing the Web address converter for dynamic Web pages.

FIG. 3 shows a process for handling a request for dynamic Web pages that is implemented by the Web address converter. At 200, a request to access a Web page is received by a Web server or a filter (such as the filter 46 in FIG. 1). For the exemplary implementation, the filter receives the request. Such a request may be a GET request in HTTP.

If the request includes a dynamic address, then the filter passes it back to the Web server for normal dynamic Web page invocation. Otherwise, the request includes a static Web address. At 202, the filter parses the request to extract the static address included therein.

At 204, the static address is examined to determine if it includes an "alias-indicator flag." The alias-indicator flag is any set of unique (within the Web server) alphanumeric characters that may be used within a static address to identify the address as being an "alias address." For example, the flag may be "root", "flag", "static", or "alias". The field containing the alias-indicator flag is shown at 162 in FIG. 2. An "alias address" is a static address that points to a dynamic Web page rather than a static one. There are two sources of an "alias address."

The first source is where an alias address is a resulting static address from the exemplary D-to-S address conversion. During the D-to-S address conversion, the alias-indicator flag is inserted into the resulting static address in the manner shown at blocks 160 and 170 in FIG. 2.

The second source of an alias address is an address stored in a file on the Web server. That file is called the "robots.txt" file. The address stored in this file includes the alias-indicator flag.

Figure 4:
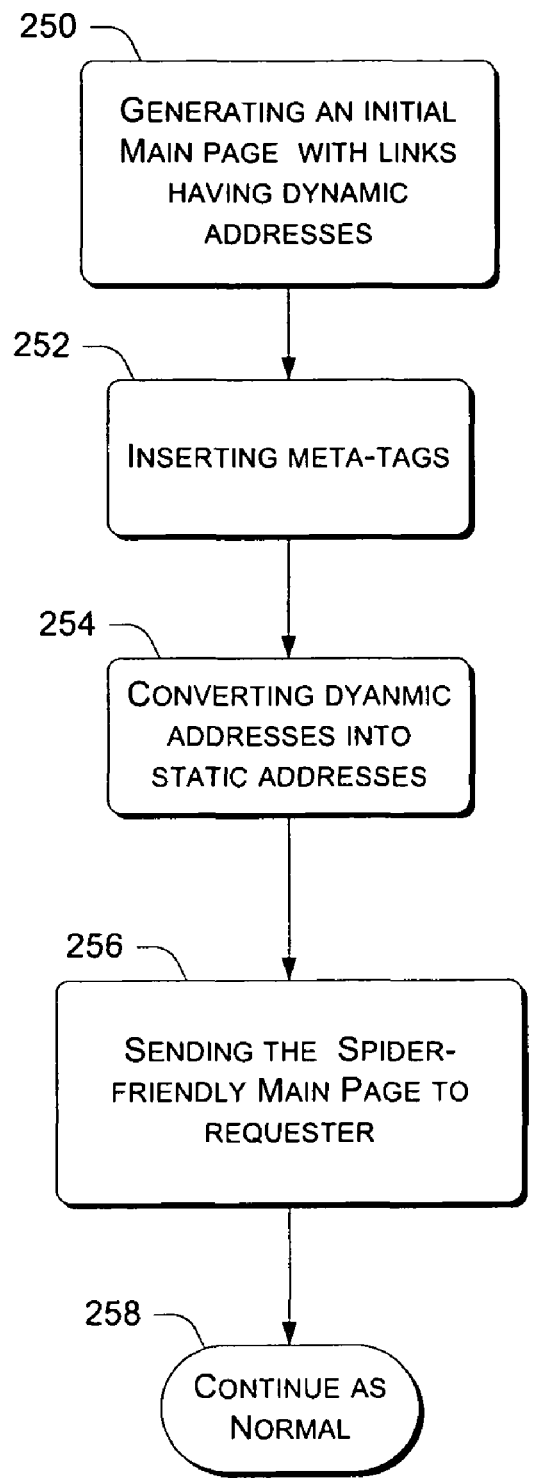
FIG. 4 is flowchart showing a process implementing the Web address converter for dynamic Web pages.

This "robots.txt" file informs a spider whether the spider is authorized to search the site and if so authorized, which pages on the site to retrieve. In the exemplary embodiment, the "robots.txt" file authorizes a spider to access only one page and that page is a "spider-friendly main" Web page (i.e., "spider-friendly index" page). The spider-friendly main page is generated upon access. The generation of the spider-friendly main page is illustrated in FIG. 4, which is discussed below.

Therefore, if the static address parsed from the request is an "alias address", then the process will proceed to block 208 for further analysis of the static address. Otherwise, the static address is a conventional static address and it points to an actual static Web page. In this case, the process will proceed to block 206 to allow access to an actual static Web page as normal. The filter will hand the static address to the Web server so that the Web server can access and send the referenced static Web page.

At 208 of FIG. 3, the static address (which is now known to be an alias address) is further examined to determine if the address includes parameter values. Parameter values are fields after the path in the static address. Referring again to FIG. 2, "/valx/vallast.htm" are parameter values after "path" in static address 172 of block 170.

If the static address does not have parameter values, then the static address points to the spider-friendly main page. Therefore, the process proceeds to block 210 and the generation of the spider-friendly main page illustrated in FIG. 4, which is discussed below. If the static address includes parameter values, then the static address points to a dynamic Web page, then the process proceeds to block 212.

At 212, the static address is converted into its mapped dynamic address in the manner illustrated from bottom to top in FIG. 2 and described above as the S-to-D address conversion. This produces a dynamic address that points to an existing file storing instructions for dynamically generating the dynamic Web page.

At 214, the dynamic Web page referenced by the converted dynamic address is invoked. When generating the web page, meta-tags may also be inserted. Such meta-tags help the search engines properly index each individual web page. The meta-tags may be derived from a variety of sources. For example, the meta-tags may be dynamically generated from the content of the web page. Alternatively, the meta-tags may be retrieved from the database. In yet a further alternative, the meta-tags may be from a variety of sources, such as a combination of meta-tags that are dynamically generated and meta-tags that are retrieved from a database or provided by some other component.

The purpose of inserting these meta-tags is to enhance the chances of the specific page being found during a search of a search engine. The use of meta-tags increases the breadth of keywords used on the page. This increases the likelihood of the specific page being found during a search on a search engine. At 216, the dynamic Web page is sent to the requester. Dynamic Web pages have instructions and the dynamic addresses have parameters and values. These instructions, the parameters, the values are used to generate (i.e., invoke) a Web page based upon information in the database. At 218, on-going Web page access continues as normal.

In blocks 204 and 208, the filter makes three determinations in this order:

Does the request include a normal static address to access actual static Web pages?

If not, then does the request include a "special" static address? A static address is "special" if it includes an alias-indicator flag.

If the static address is "special", then does the address point to the spider-friendly main page or does it point to somewhere else?

The exemplary converter makes these three determinations by detecting an alias-indicator flag (like "flag" of block 162 of FIG. 2) and parameter values (like "valx" and "vallast" of blocks 148 and 150 of FIG. 2).

Alternatively, the determinations may be made by employing multiple flags in the static address. Each flag helps the filter make each determination. In addition, the spider-friendly main page may have a defined address that contains no flags itself, but the filter will recognize the defined address.

FIG. 4 shows more of the process for handling a request for dynamic Web pages that is implemented by the Web address converter. Specifically, FIG. 4 shows the generation of the spider-friendly main page, which is represented by block 210 of FIG. 3.

At 250, the filter dynamically generates an initial main page. This initial main page includes links containing dynamic addresses pointing to dynamic Web pages. These dynamic Web pages may represent the current inventory for an e-commerce site.

At 252, meta-tags are inserted into the initial main page. The filter has a defined set of meta-tags that are inserted each time a main page is generated. Alternatively, the filter dynamically generates a set of meta-tags that are created based upon current information in the database. Further, the filter may directly retrieve the meta-tags from the database.

Like the meta-tags generated for a specific dynamic Web page of block 214, the purpose of inserting these meta-tags into the main page is to enhance the chances of the page being found during a search of a search engine. The use of meta-tags increases the breadth of keywords used on the page. This increases the likelihood of the main page being found during a search on a search engine.

At 254, the dynamic addresses in these links are converted into static addresses in the manner described above as D-to-S address conversion and shown from top to bottom in FIG. 2.

At 256, the filter sends the spider-friendly main page to the requester. The requester is typically a browser or a spider. At 258, on-going Web page access continues as normal.

Exemplary Computer

FIG. 5 shows a computer that is an example of a Web server that is used with the exemplary implementation of the Web address converter for dynamic Web pages. This computer may be a client running a Web browser, a Web server running a search engine, a Web server hosting a static Web site, a Web server hosting a dynamic Web site, or any computer within a communications network (such as the Internet).

As shown in FIG. 5, computer 330 includes one or more processors or processing units 332, a system memory 334, and a bus 336 that couples various system components including the system memory 334 to processors 332. Bus 336 represents one or more of any of several types of bus structures, including a memory bus or memory controller, a peripheral bus, an accelerated graphics port, and a processor or local bus using any of a variety of bus architectures.

The system memory includes read only memory (ROM) 338 and random access memory (RAM) 340. A basic input/output system (BIOS) 342, containing the basic routines that help to transfer information between elements within computer 330, such as during start-up, is stored in ROM 338.

Computer 330 further includes a hard disk drive 344 for reading from and writing to a hard disk, not shown, a magnetic disk drive 346 for reading from and writing to a removable magnetic disk 348, and an optical disk drive 350 for reading from or writing to a removable optical disk 352 such as a CD ROM, DVD ROM or other optical media. The hard disk drive 344, magnetic disk drive 346 and optical disk drive 350 are each connected to bus 336 by one or more interfaces 354.

The drives and their associated computer-readable media provide nonvolatile storage of computer readable instructions, data structures, program modules, and other data for computer 330. Although the exemplary environment described herein employs a hard disk, a removable magnetic disk 348 and a removable optical disk 352, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 348, optical disk 352, ROM 338, or RAM 340, including an operating system 358, one or more application programs 360 (such as a Web browser), other program modules 362, and program data 364. A user may enter commands and information into computer 330 through input devices such as keyboard 366 and pointing device 368. Other input devices (not shown) may include a microphone, joystick, game pad, satellite dish, scanner, or the like. These and other input devices are connected to the processing unit 332 through an interface 370 that is coupled to bus 336.

A monitor 372 or other type of display device is also connected to bus 336 via an interface, such as a video adapter 374. In addition to the monitor, personal computers typically include other peripheral output devices (not shown) such as speakers and printers.

Computer 330 can operate in a networked environment using logical connections to one or more remote computers, such as a Web server 382. Web server 382 typically includes many or all of the elements described above relative to computer 330. In addition, a Web database 384 may be connected to the Web server 382.

A logical connection that is not depicted in FIG. 5 is a local area network (LAN) via network interface 386 and a general wide area network (WAN) via a modem 378. Such networking environments are commonplace in offices, enterprise-wide computer networks, intranets, and the Internet.

Depicted in FIG. 5, is a specific implementation of a WAN via the Internet. Over the Internet, computer 330 typically includes a modem 378 or other means for establishing communications over the Internet 380. Modem 378, which may be internal or external, is connected to bus 336 via interface 356.

In a networked environment, program modules depicted relative to the personal computer 330, or portions thereof, may be stored in the remote memory storage device. It will be appreciated that the network connections shown and described are exemplary and other means of establishing a communications link between the computers may be used.

EXAMPLE

"Acmetoys.store" Dynamic Web Site

The following example is provided to help illustrate how the exemplary implementation of the Web address converter might be used.

Suppose that a fictional company called "Acme Toy Store" has an e-commerce Web site where it sells toys and playthings. Acme's Web address is "http://acmetoys.store". Like a "brick-and-mortar" store, Acme's e-commerce site has an inventory that is constantly changing as existing items are sold and shipped and new items arrive. Therefore, Acme's Web site has dynamically accessible and updateable database for tracking inventory. Acme can track its inventory in real time and users of Acme's site can order "in-stock" items in real time.

Acme would like for Internet search engines to be a source of inexpensive advertisement for its toys. Acme would like for the spiders of search engines to crawl its Web site and index its products. That way, a search engine may direct a user (who is searching for that hot new toy from overseas) to Acme's site. Preferably, the search engine may direct the user to the particular page on the site referring to that hot new toy. Acme would like users to go directly to their dynamic Web pages so that the user can view the current product information.

Acme implements the exemplary embodiment of the Web address converter in an ISAPI filter on its Web site. Acme modifies is "robots.txt" file on its Web server to authorize and direct spiders to crawl a spider-friendly main page at "http://acmetoys.store/flag/index.htm". The alias-indicator flag is "flag."

Subsequently, a spider from a search engine arrives to crawl Acme's site. The spider examines the "robots.txt" file and proceeds to access the spider-friendly main page.

Referring to the flow charts shown in FIGS. 3 and 4, the filter receives (at 200 of FIG. 3) a request from the spider to access a Web page. The filter parses (at 202) the request and pulls out this static address: "http://acmetoys.store/flag/index.htm".

Upon examination (at 204) of this address, the filter determines that it includes "flag", which is the alias-indicator flag. Upon further examination (at 208) of this address, the filter determines that the address does not include any parameter values.

Therefore, the filter generates an initial main page having links with dynamic addresses (at 250 of FIG. 4). The dynamic addresses point to dynamic Web pages describing the available toys and providing a means for purchasing such toys. The filter inserts (at 252) a set of meta-tags into the initial main page. The meta-tags have many keywords related to toys and playthings.

D-to-S conversion (at 254) is performed on the dynamic address so that the links include static addresses. These static addresses will include the alias-indicator flag and one or more parameter values.

Below is an example of Web address conversion using a dynamic Web page on Acme's site that describes a fictional product called "megawheel." The following example of D-to-S address conversion is done in accordance with such D-to-S address conversion illustrated in FIG. 2 and described above:

Megawheel Dynamic Address http://acmetoys.store/toys/wheeled.asp?age=4-or-under&name=megawheel The following is a table identifying the fields illustrated in FIG. 2 and described above. The field names are italicized. The table also gives the specific values of these fields:

| Common Fields | | Dynamic Fields Removed | | Static Fields Added | |
|---|---|---|---|---|---|
| scheme | http:// | field separator | / | field separator | / |
| hostname | acmetoys.store | dynamic file extension | ".asp" | flag | flag |
| path | toys/wheeled | file-parameter-separator | ? | field separator | / |
| valx | 4-or-under | parameter | age | field separator | / |
| vallast | megawheel | parameter separator | & | field separator | / |
| | | last parameter | name | static file extension | ".htm" |

Resulting example static address (after D-to-S address conversion):

Megawheel Static Address http://acmetoys.store/flag/toys/wheeled/4-or-under/megawheel.htm After the D-to-S address conversion of the address in the links in the initial main page, the page becomes the spider-friendly main page. The filter sends (at 256) the spider-friendly main page to the original requester, which was the spider of the search engine.

The indexer of the search engine indexes the spider-friendly main page of Acme's Web site. Keywords from the spider-friendly main page are stored in the search engine's database.

Subsequently, a user searches for a toy called "megawheel" on the search engine. It discovers a link to Acme's Web site. That link includes the megawheel static address (as shown above). The user clicks on that link and is whisked away to Acme's site.

Again referring to the flow charts shown in FIGS. 3 and 4, the filter receives (at 200 of FIG. 3) a request from the browser of the user to access a Web page. The filter parses (at 202) the request and pulls out the megawheel static address: "http://acmetoys.store/flag/toys/wheeled/4-or-under/megawheel.htm".

Upon examination (at 204) of this address, the filter determines that it includes "flag", which is the alias-indicator flag. Upon further examination (at 208) of this address, the filter determines that the address includes parameter values. Specifically, the address includes "4-or-under" and "megawheel" parameter values. The filter performs S-to-D address conversion (at 212) on the static address so that browser can be redirected to the megawheel dynamic Web page.

S-to-D address conversion is done in accordance with such S-to-D conversion illustrated in FIG. 2 and described above. The static address is converted into megawheel dynamic address: "http://acmetoys.store/toys/wheeled.asp?age=4-or-under&name=megawheel". Note that this is the megawheel dynamic address and the same address that was the source for the D-to-S address conversion performed when generating the spider-friendly main page.

After this S-to-D address conversion, the desired megawheel dynamic Web page is invoked and megawheel-related meta tags are inserted into the page (at 214). The page is sent to the browser of the user (at 216). Therefore, the user views the current dynamic Web page for the "megawheel" product. The user found the megawheel dynamic Web page using a corresponding megawheel static address stored in a searchable database of a search engine.

CONCLUSION

Using the exemplary implementation of the Web address converter, spiders can fetch and indexers can index the dynamic content of dynamic Web sites. Furthermore, browsers using a static address to a dynamic Web page of a dynamic Web site can access the referenced dynamic Web page, rather then a stale, static copy.

Although the address converter has been described in language specific to structural features and/or methodological steps, it is to be understood that the web address converter defined in the appended claims is not necessarily limited to the specific features or steps described. Rather, the specific features and steps are disclosed as preferred forms of implementing the claimed web address converter.

The invention claimed is:

1. One or more computer-readable storage devices comprising computer executable instructions that, when executed by a computer, perform acts comprising:
   parsing a dynamic address pointing to a dynamic Web page to identify one or more fields within the dynamic address, the one or more identified fields, including a parameter value, wherein the parameter value is located after a path field of the dynamic address;
   converting the dynamic address into a static address by placing the one or more fields of the dynamic address into the static address, wherein the static address includes the parameter value of the dynamic address, and wherein the static address points to the dynamic Web page;
   parsing the static address in response to receiving a request for the dynamic Web page; and
   converting the static address into the dynamic address.

2. The one or more computer-readable storage devices of claim 1, wherein a position of the parameter value in the static address is based on a position of the parameter value in the dynamic address.

3. The one or more computer-readable storage devices of claim 1, wherein the parameter value is associated with a corresponding parameter name included in the dynamic address.

4. The one or more computer-readable storage devices of claim 3, wherein the parameter name is absent from the static address and the static address is converted to the dynamic address by inserting the parameter name and the parameter value into the dynamic address based on a position of the parameter value in the static address.

5. The one or more computer-readable storage devices of claim 3, wherein the static address includes the parameter name associated with the parameter value.

6. A method to convert a static address to a dynamic address, the method comprising: receiving a request at a Web server from a client device browser to access a dynamic Web page, the request including the static address and the static address pointing to the dynamic Web page, and wherein the Web server is configured to execute a Web address converter; parsing the static address at the Web server to identify and separate fields within the static address; identifying one or more fields of the static address specific to static addresses at the Web server; converting the static address to a dynamic address at the Web server by removing the one or more fields of the static address specific to static addresses from the static address, the dynamic address pointing to the dynamic Web page; and sending the dynamic Web page from the Web server to the client device browser.

7. The method of claim 6, further comprising identifying one or more fields of the static address that are common to dynamic addresses and static addresses at the Web server.

8. The method of claim 7, further comprising identifying one or more fields specific to dynamic addresses at the Web server.

9. The method of claim 8, further comprising adding, at the Web server, the one or more fields specific to dynamic addresses to the one or more fields of the static address that are common to dynamic addresses and static addresses to generate the dynamic address.

10. The method of claim 6, further comprising inserting a number of meta-tags into the dynamic Web page at the Web server, the number of meta-tags increasing the breadth of keywords used on the dynamic Web page.

11. The method of claim 10, wherein the number of meta-tags are generated from content of the dynamic Web page.

12. The method of claim 10, wherein the number of meta-tags are retrieved from a database.

13. The method of claim 6, further comprising determining, at the Web server, whether the static address includes an alias-indicator flag, wherein the dynamic address is generated when the static address includes the alias-indicator flag.

14. The method of claim 6, further comprising determining, at the Web server, whether the static address includes one or more parameter values, wherein the dynamic Web page is generated based on the one or more parameter values.

15. The method of claim 14, wherein the one or more parameter values are included in one or more fields of the static address that are common to dynamic addresses and static addresses.

16. A system comprising: one or more processors; and a Web address converter executable by the one or more processors to: parse a dynamic address pointing to a dynamic Web page to identify one or more fields of the dynamic address specific to dynamic addresses; and convert the dynamic address to a static address by removing the one or more fields specific to dynamic addresses from the dynamic address and incorporating a value of at least one field of the dynamic address into the static address after removing the one or more fields specific to dynamic addresses from the dynamic address, the static address pointing to the dynamic Web page.

17. The system of claim 16, wherein the Web address converter is executable by the one or more processors to convert the dynamic address to the static address by identifying one or more fields of the dynamic address that are common to dynamic addresses and static addresses.

18. The system of claim 17, wherein the Web address converter is executable by the one or more processors to convert the dynamic address to the static address by identifying one or more fields specific to static addresses and adding the one or more fields specific to static addresses to the one or more fields of the dynamic address that are common to dynamic addresses and static addresses to generate the static address.

19. The system of claim 18, wherein the one or more fields specific to dynamic addresses includes a different number of fields than the one or more fields specific to static addresses.

20. The system of claim 18, wherein the one or more fields specific to static addresses includes an alias-indicator flag specifying that the static address points to the dynamic Web page.

* * * * *